(No Model.)

M. MORAN.
NUT LOCK.

No. 279,000. Patented June 5, 1883

Attest:
Wm. G. Sayers
Herbert Knight

Inventor:
Michael Moran
By Knight Bro.
Attys

UNITED STATES PATENT OFFICE.

MICHAEL MORAN, OF ST. LOUIS, MISSOURI.

NUT-LOCK.

SPECIFICATION forming part of Letters Patent No. 279,000, dated June 5, 1883.

Application filed March 14, 1883. (No model.)

*To all whom it may concern:*

Be it known that I, MICHAEL MORAN, of the city of St. Louis, and State of Missouri, have invented a certain new and useful Improvement in Nut-Locks, of which the following is a full, clear, and exact description, reference being had to the accompanying drawings, forming part of this specification.

My invention relates to those nut-locks in which bolts are employed, having a straight axial bore and a surrounding solid wall.

My improvement consists in combining with such bolts a cylindrical set or round pin, equal in diameter from end to end, except the point or entering end, which is made tapering, the set or pin fitting in the expanded bore of the bolt throughout the portion of the bolt covered by the nut, whereby the nut is locked throughout its whole length. By my construction the metal is not strained nor cracked outside the nut. The bolt is not therefore weakened, because the wall surrounding the socket remains solid. Neither is a nest formed for rust. In my device the bolt is expanded equally so far into or through the body of the nut that the nut is restrained from inward as well as outward movement.

Figure 2:
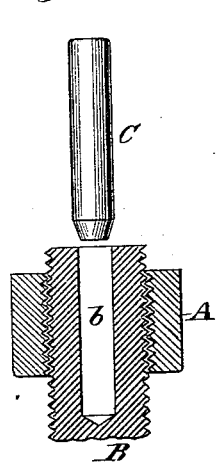
Figure 1:
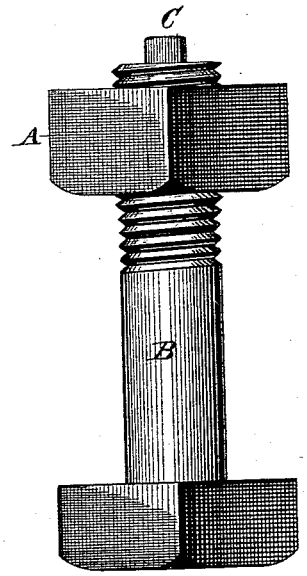
Figure 3:
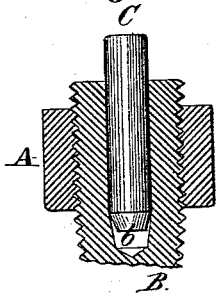

In the drawings, Figure 1 is an elevation of a bolt with the improvement applied, the expanding-pin being left in the bore. Fig. 2 is an axial section of the nut and end of the bolt before expansion. Fig. 3 is a similar section after expansion, the pin remaining in the bore.

A is the nut, of ordinary construction. B is the bolt, having an axial bore, $b$, in the end. After the nut has been screwed down to the proper position on the bolt an expander-pin, C, is forced into the bore, expanding the metal within the nut so as to hold the nut fast and prevent its movement either inward or outward. It is preferred that the metal of the bolt shall not be strained or cracked in expansion, so as to weaken it in any degree, nor to give opportunity for the entrance of moisture and consequent rusting and weakening of the metal. After expansion the tubular form of the expanded part gives it great resistive power against compression.

I claim as my invention—

In combination with a bolt having a cylindrical bore in the end, and a solid wall surrounding the bore, the cylindrical pin C, fitting in the expanded bore of the bolt throughout the portion of the bolt covered by the nut, whereby the nut is locked throughout its whole depth, substantially as shown and described.

MICHAEL MORAN.

Witnesses:
SAML. KNIGHT,
GEO. H. KNIGHT.